United States Patent [19]

Miyake et al.

[11] Patent Number: 4,502,235
[45] Date of Patent: Mar. 5, 1985

[54] CONTROL SYSTEM FOR PUSH-PULL UNIT MOUNTED ON MOTOR SCRAPER

[75] Inventors: Kimio Miyake, Yokohama; Kiyoshi Sugimoto, Kisarazu, both of Japan

[73] Assignee: Kabushiki Kaisha Komatsu Seisakusho, Tokyo, Japan

[21] Appl. No.: 566,116

[22] Filed: Dec. 27, 1983

[30] Foreign Application Priority Data

Dec. 27, 1982 [JP] Japan ............... 57-195515
Dec. 27, 1982 [JP] Japan ............... 57-195515

[51] Int. Cl.³ .................. E02F 5/00; F01L 15/00
[52] U.S. Cl. .................... 37/127; 91/189 R
[58] Field of Search ............ 37/127, 8, 118 R, 124, 37/126 R, DIG. 7; 91/189 R; 280/14 R, 65 R

[56] References Cited

U.S. PATENT DOCUMENTS

| | | |
|---|---|---|
| 3,339,658 | 9/1967 | Peterson ............... 37/127 X |
| 3,443,379 | 5/1969 | Weisenbach ............ 37/127 X |
| 3,512,278 | 5/1970 | Bechman ............... 37/127 X |
| 3,977,699 | 8/1976 | Wagatsuma . |
| 4,018,452 | 4/1977 | Wagatsuma et al. . |

Primary Examiner—E. H. Eickholt
Attorney, Agent, or Firm—Armstrong, Nikaido, Marmelstein & Kubovcik

[57] ABSTRACT

A control system for a push-pull unit mounted on a motor scraper has a push-pull control circuit including a bail actuating cylinder and a directional change-over valve, a suspension control circuit and an electric operating circuit for changing over the directional change-over valve to supply fluid under pressure from a hydraulic pump into either the push-pull control circuit or the suspension control circuit in accordance with the operator's indication. The directional change-over valve is changed over by an actuator connected with a pressure source through a pressurized medium passage in which solenoid operated valves controlled by the electric operating circuit are provided.

7 Claims, 6 Drawing Figures

CONTROL SYSTEM FOR PUSH-PULL UNIT MOUNTED ON MOTOR SCRAPER

BACKGROUND OF THE INVENTION

1. Field of the Invention

This invention relates to a control system for push-pull unit mounted on a motor scraper, and more particularly to a control system having an improved operational response characteristic which is provided with an electrically operating unit including therein solenoid valves so that the fluid under pressure delivered by a hydraulic pump can be supplied into either one of a bail actuating cylinder and suspension cylinders in accordance with the application without directing the fluid simultaneously into both the cylinders.

2. Description of the Prior Art

A motor scraper for use in scraping and leveling the ground is comprised of a drive vehicle body having an engine mounted thereon, and a bowl vehicle body having a scraper blade fitted in the lower part thereof and adapted to be loaded with the scraped earth and sand.

Usually, ground scraping and leveling operation can be carried out by one motor scraper; however, in case where comparatively stiff ground is scraped or leveled or in case of heavy scraping wherein a great deal of earth is scraped, two or more motor scrapers connected tandem are used for increasing the driving force. Therefore, each of the front and rear motor scrapers is provided with a push-pull unit adapted to form a pair with another unit mounted on the front part or rear part of another vehicle.

In the front part of the drive vehicle body, this push-pull unit includes a push block movably fitted to the vehicle body frame and a bail pivotally mounted on the push block so as to oscillate freely, whilst in the rear part of the bowl vehicle body a pushed block having a hook engageable with the bail is fixedly secured to the vehicle body frame.

Whilst, the bowl vehicle body of the motor scraper is provided with a suspension control system including a suspension cylinder for adjusting the height of the vehicle so that the vehicle height may be controlled in accordance with respective requirements when running, scraping earth and loading the scraped earth.

In the control systems of the kind specified, a hydraulic circuit for controlling the suspension control system which includes a flow divider has been used as a hydraulic circuit for the push-pull unit. As a result, the flow rate passing through the suspension controlling hydraulic circuit is reduced which gives a bad influence on the operational response characteristic. Further, since the control operation is made hydraulically, it is required to move the lever of the push-pull control valve manually. Therefore, it is necessary to provide a valve of a special type with a lever within a cabin of the vehicle, so that it is dangerous, and also a long hydraulic piping is required to be installed causing a high pressure loss which results in an increase in the load of the engine.

Further, in the prior art control systems, since the fluid is always relieved at a constant pressure at raised position of the bail, the engine load increases, and also provision of separate levers is required for push-pull control and suspension control, respectively, rendering their operation difficult.

SUMMARY OF THE INVENTION

The present invention has been contemplated in view of the above-mentioned circumstance, and has for its object to provide a control system for push-pull unit mounted on a motor scraper wherein the fluid under pressure is supplied into a suspension control circuit only when the bail control valve is located at its neutral position thereby preventing a deterioration in the operational response characteristic due to a reduction in the flow rate of the fluid, and suspension control and push-pull control are conducted properly and individually by operating only one operating lever switch thereby obtaining an improved operational response characteristic.

To achieve the above-mentioned object, according to the present invention, there is provided a control system for push-pull unit mounted on a motor scraper, characterized in that the control system comprises a push-pull control circuit including a bail actuating cylinder; a suspension control circuit including a plurality of suspension cylinders; a directional change-over valve means adapted to change-over the supply of the fluid under pressure delivered by a hydraulic pump into either one of said push-pull control circuit or said suspension control circuit in accordance with the indication of the operator; and an electric operating circuit for changing over said directional change-over valve, the electric operating circuit being connected with an electric power source.

Further, according to the present invention, there is provided a control system for push-pull unit mounted on a motor scraper characterized in that said directional change-over valve means comprises an actuator for change-over operation; a pressurized medium passage connecting said actuator and a pressurized medium supply source; and solenoid operated valve means provided in said pressurized medium passage to change over the direction of supply of the pressurized medium into said actuator, said solenoid operated valve means being connected with said electric operating circuit.

Further, according to the present invention, there is provided a control system for push-pull unit mounted on a motor scraper, characterized in that said directional change-over valve means includes a bail control valve.

Still further, according to the present invention, there is provided a control system for push-pull unit mounted on a motor scraper, characterized in that said electric operating circuit comprises an operating lever switch, and a limit switch adapted to be turned off or on in accordance with rising-up or falling-down of the bail.

BRIEF DESCRIPTION OF THE DRAWINGS

The above and other feautures and advantages of the invention will be apparent from the following description taken in conjunction with the accompanying drawings wherein.

DETAILED DESCRIPTION OF THE INVENTION

The present invention will now be described in detail with reference to the accompanying drawings.

Figure 1:
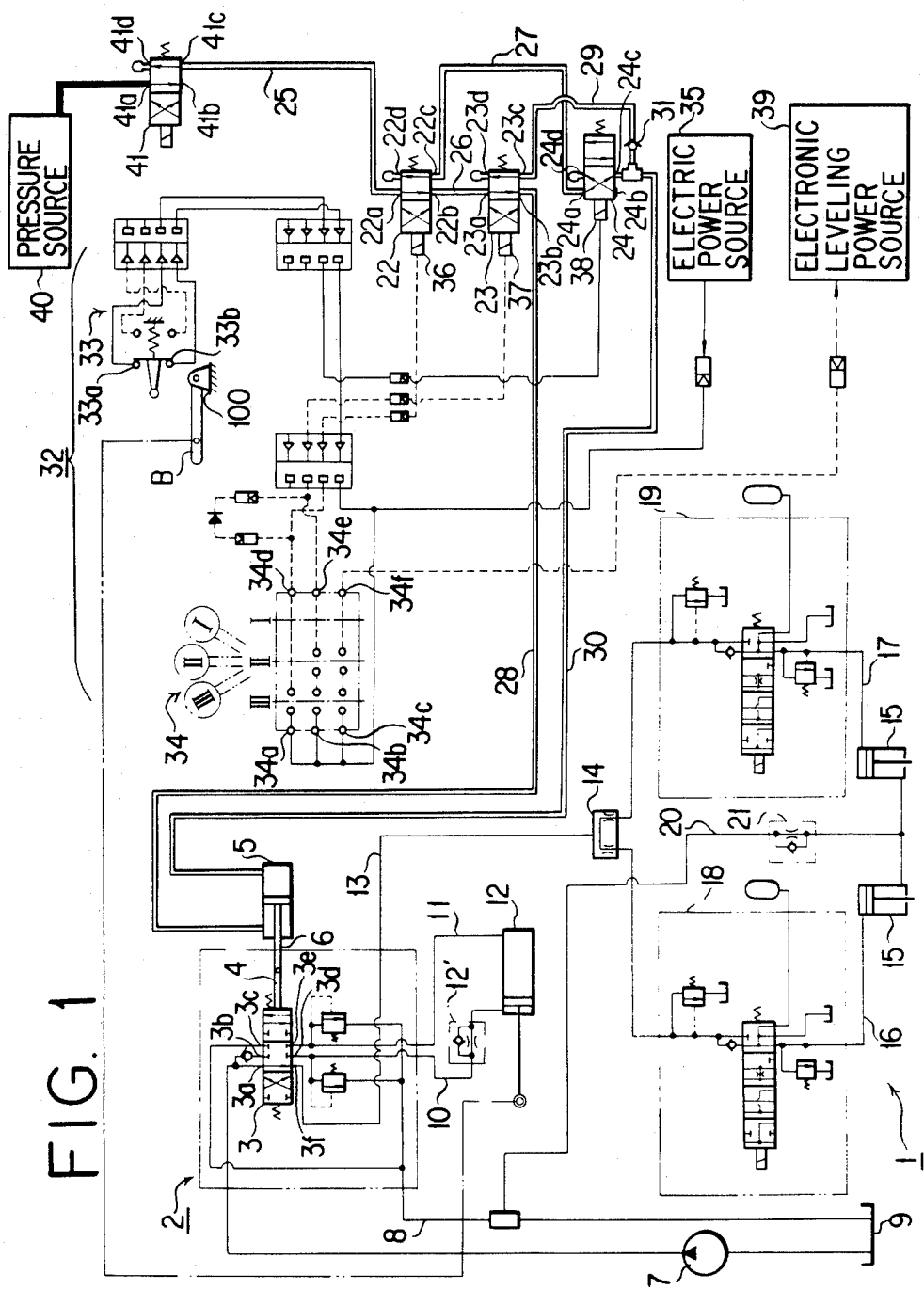
FIG. 1 is an explanatory view showing one embodiment of a control system for a push-pull unit mounted on a motor scraper.

In FIG. 1, reference numeral 1 denotes a suspension control circuit, and 2 a push-pull control circuit. The push-pull control circuit 2 includes a directional change-over valve 3 which also serves as a bail control valve. The directional change-over valve 3 has a spool 4 connected to a piston rod 6 of an actuator 5 for change-over operation. The directional change-over valve 3 has pump ports 3a, 3b connected through a conduit to the delivery side of a hydraulic pump 7, and a tank port 3c connected through a drain conduit 8 to a tank or fluid reservoir 9. The directional change-over valve 3 has further connecting ports 3d and 3e connected through conduits 10 and 11 to a bail actuating cylinder 12, the conduit 10 including a restrictor of orifice 12' connected thereto. The directional change-over valve 3 has a further port 3f which is connected through a conduit 13 to the inlet of a flow divider 14 whose outlets are connected through conduits 16, 17 to respective head side pressure chambers of left and right suspension cylinders 15, 15. These conduits 16, 17 include automatic leveling control valve means 18, 19 which are connected with an electronic leveling power source 39. The rod side ends of the suspension cylinders 15, 15 are connected through a drainage conduit 20 to the trank 9, the drainage circuit 20 including a restrictor or orifice 21.

Further, reference numerals 22, 23 and 24 denote first, second and third solenoid operated values, respectively. The first solenoid operated valve 22 has a port 22a connected through supply conduit 25 for a pressurized fluid, for example, compressed air to a pressure source such as, for example, air tank or reservoir 40, a port 22b connected through a conduit 26 to a port 23a of the second solenoid operated valve 23, and a further port 22c connected through a conduit 27 to a port 24a of the third solenoid operated valve 24. A port 23b of the second solenoid operated valve 23 is connected through a conduit 28 to a rod side pressure chamber of the actuator 5 for change-over operation, and another port 23c and a port 24c of the third solenoid operated valve 24 are connected through conduits 29 and 30 to a head side pressure chamber of the actuator 5. The conduit 29 is provided with a check valve 31. A port 24b of the third solenoid operated valve 24 is stopped. Ports 22d, 23d and 24d are all exhaust ports, respectively.

In FIG. 1, reference numeral 32 denotes an electric operating circuit for the first, second and third solenoid operated valves 22, 23 and 24. This circuit 32 comprises a limit switch 33 actuated by rising-up and falling-down of a bail B pivotally mounted through a push block (not shown) on the vehicle body 100, and an operating lever switch 34. The operating lever switch 34 has contacts 34a, 34b, 34c connected with an electric power source 35, and a contact 34d connected with solenoid 36 of the first solenoid operated valve 22. The switch 34 has a contact 34e connected with solenoid 37 of the second solenoid operated valve 23, and a further contact 34f connected with the electronic leveling power source 39. The limit switch 33 has a contact 33a connected with solenoid 38 of the third solenoid operated valve 24, and a further contact 33b connected with the electric power source 35. Reference numeral 41 denotes a further solenoid operated valve adapted to be turned on at the same time when an engine starting switch (not shown) is actuated to supply the pressurized fluid from the pressure source 40 into the conduit 25. A port 41b of the solenoid operated valve 41 is stopped, and a port 41d thereof is an exhaust port.

Further, the automatic leveling control valve means 18 and 19 are adapted to be actuated only when the electronic leveling power source supplies electric current in accordance with the operation of the operating lever switch 34.

The operation of the control system according to the present invention will now be described with reference to FIGS. 2 to 6.

Figure 2:
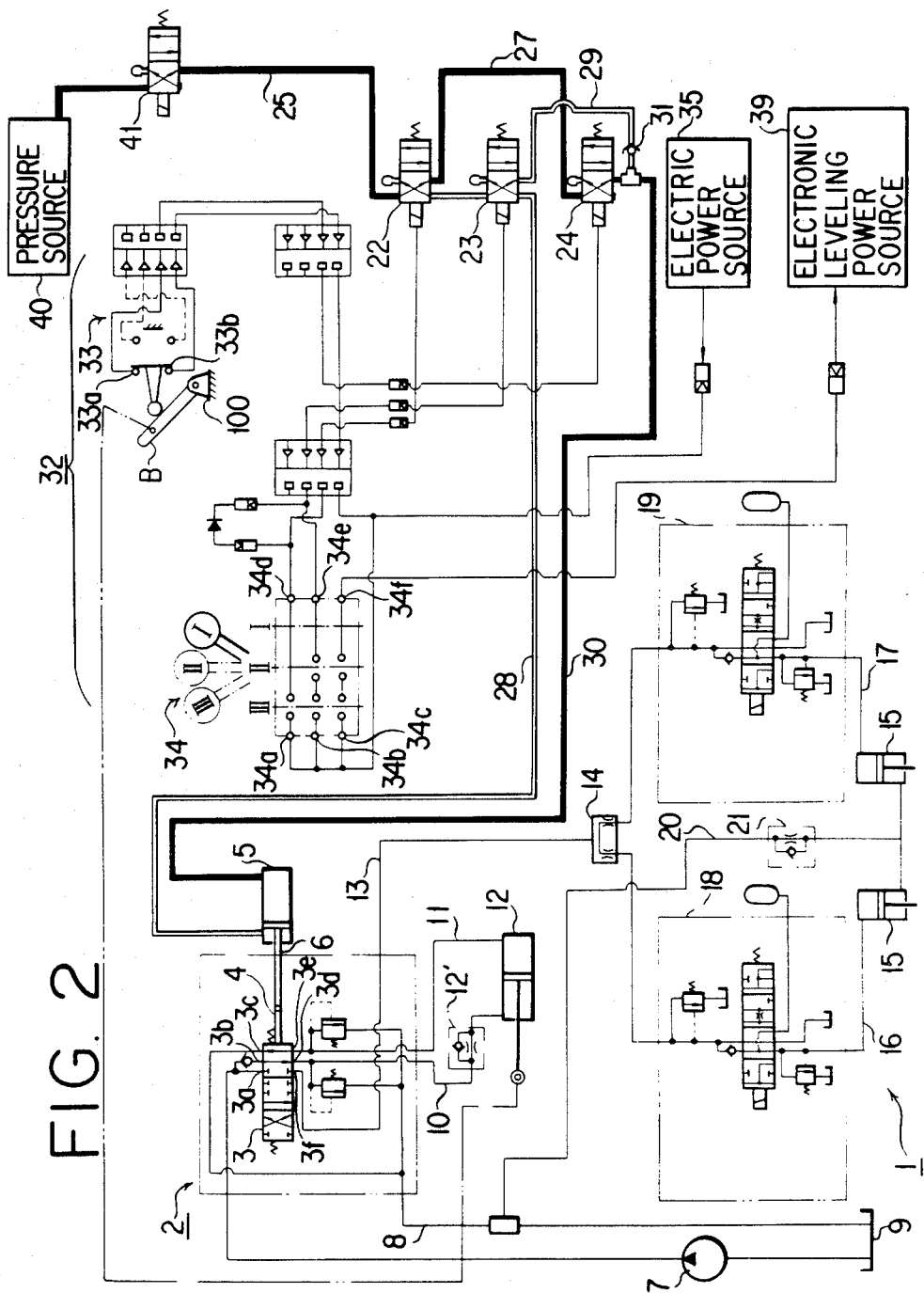
FIGS. 2 to 6 are explanatory views showing the operation of the control system shown in FIG. 1.
Figure 3:
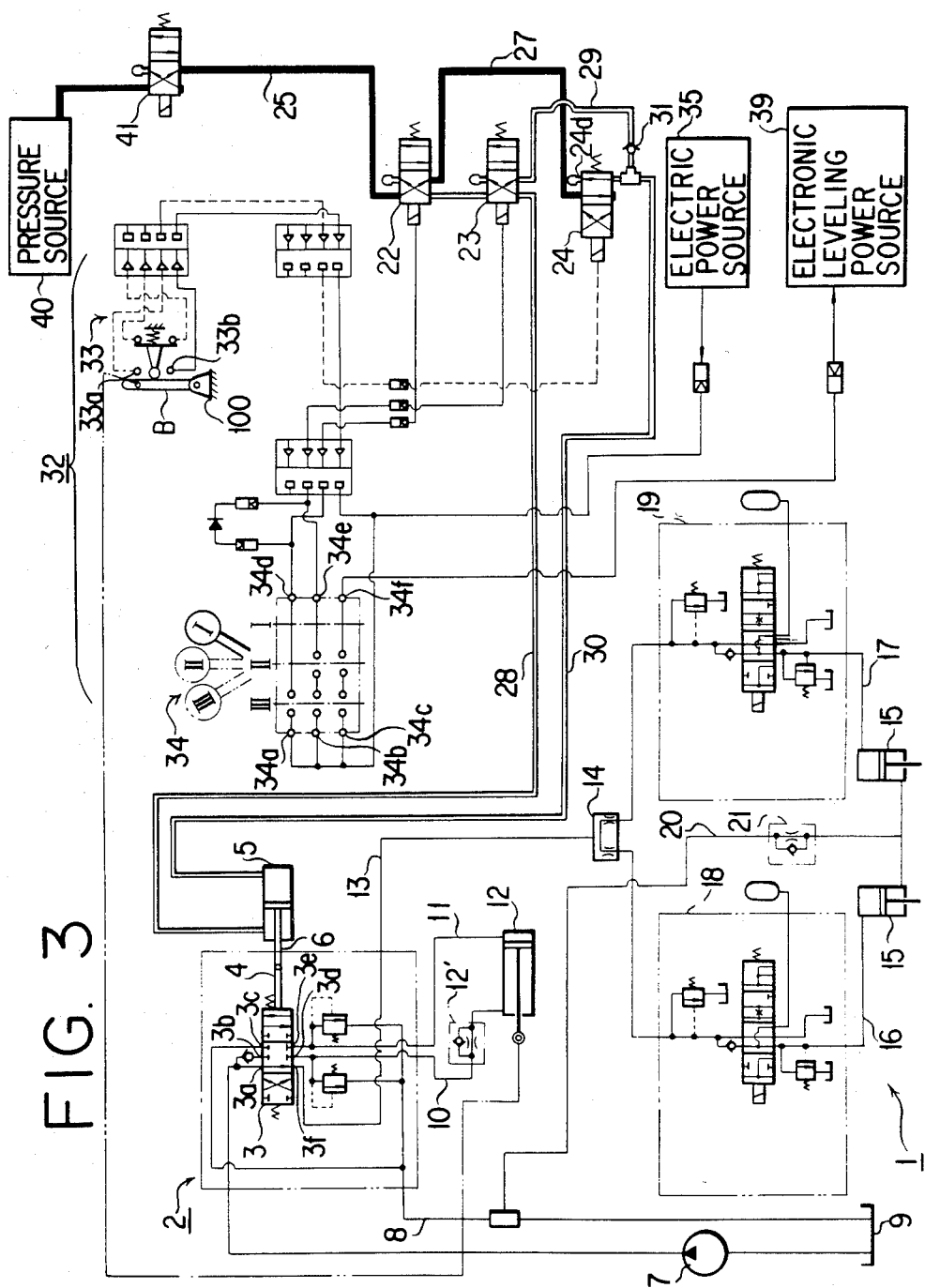

First, in order to change the condition wherein two or more motor scrapers are connected tandem to respective independent running condition, it is necessary to raise the bail B. Except when the bail B occupies its top dead centre, the limit switch 33 is turned on. If, under this condition, the operating lever switch 34 is shifted to a position I as shown in FIG. 2, electric current flows through all the wirings of the electric operating circuit 32 shown by a solid line. As a result, all the solenoid operated valves 22, 23 and 24 are turned on so that the pressurized fluid from the pressure source 40 flows as shown by a thick line, and thence into the pressure chamber on the head side of the actuator 5 for change-over operation. Consequently, the directional change-over valve 3 is moved to the left from its neutral position so that the pressurized fluid from the hydraulic pump 7 may be supplied into the rod side pressure chamber of the bail actuating cylinder 12 so as to allow the bail to start rising-up. At that time, no pressurized fluid is supplied into the suspension control circuit 1, and all the fluid from the hydraulic pump 7 is supplied into the bail actuating cylinder 12 so that an improved operability of the cylinder 12 is obtained thus allowing the bail to rise quickly towards its top dead centre.

When the bail B has reached its top dead centre, the limit switch 33 is turned off. As a result, electric current flows through the wirings of the electric operating circuit 32 so that the solenoid operated valves 22 and 23 may be turned on. Consequently, the pressurized fluid within the actuator 5 flows through a conduit 30 as shown by a thick line in FIG. 3 and then is discharged through the exhaust port 24d of the solenoid operated valve 24. Accordingly, the actuator 5 for change-over operation is placed in float condition, and the directional change-over valve 3 is returned by the force of a spring into its neutral position. As a result, the bail actuating cylinder 12 is locked, whilst all the pressurized fluid delivered by the hydraulic pump 7 is supplied into the suspension control circuit 1. Further, because the electronic leveling power source 39 is supplied with power, the automatic leveling control valve means 18 and 19 are actuated so that the motor scraper can run individually while keeping a predetermined vehicle height.

Figure 4:
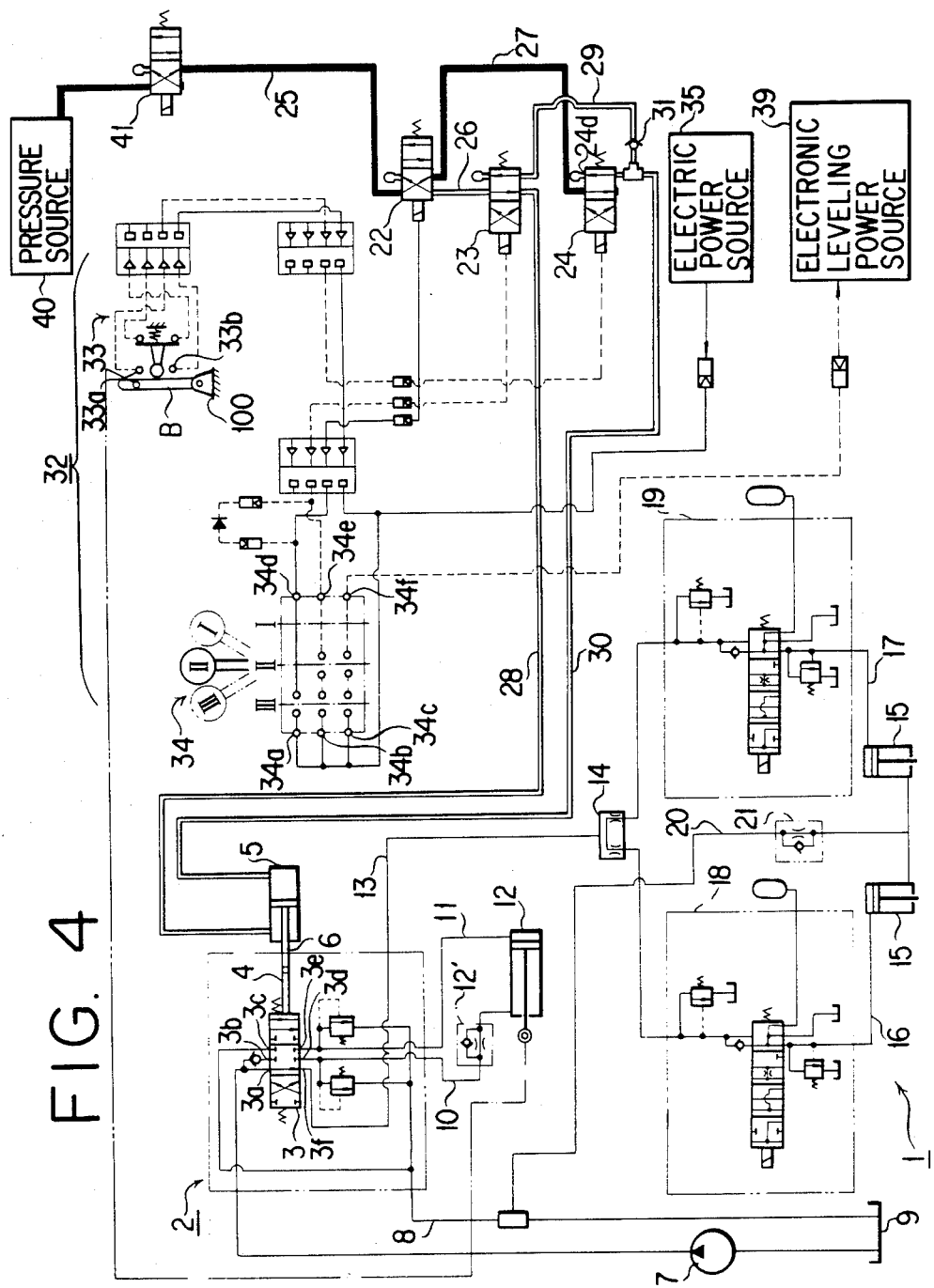

If, subsequently, ground scraping and leveling operations are made by the motor scraper, the operating lever switch 34 is shifted to a position II . Consequently, electric current flows through the wirings shown by a thick line in FIG. 4, thus allowing only the solenoid operated valve 22 to turn on. The pressurized fluid from the pressure source 40 is discharged through the port 24d of the solenoid operated valve 24 as in the case shown in FIG. 3, and the directional change-over valve 3 is located at its neutral position in the similar manner. In FIG. 4, however, different from the condition shown in FIG. 3, the electronic leveling power source 39 is not supplied with power so that the automatic leveling control valve means 18 and 19 are not actuated and the pressurized fluid from the hydraulic pump 7 and that filled in the rod side pressure chambers of the suspension cylinders 15, 15 are drained and returned into the tank 9. As a result, the suspension cylinders 15, 15 are locked by the dead weight of the motor scraper so that it may be kept at a lowest height.

Figure 5:
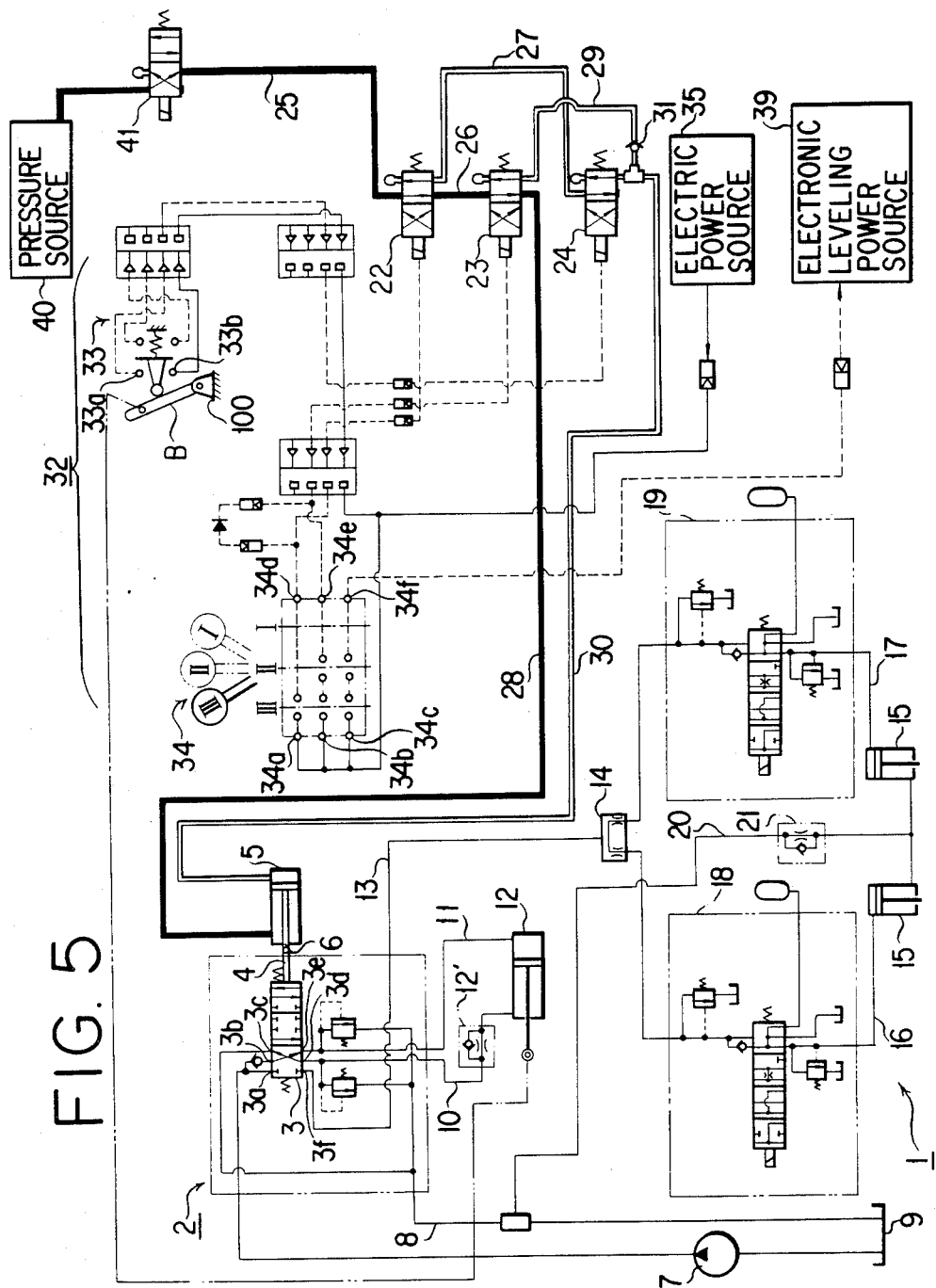

Further, in case where two or more motor scrapers are connected tandem again, the operating lever switch 34 is shifted to position III when the bail is located at its top dead centre. Consequently, no electric current flows through the wirings of the electric operating circuit 32 as shown in FIG. 5 except for the wirings connected directly with the electric power source 35 to thereby turn off the solenoid operated valves 22, 23 and 24. Therefore, the pressurized fluid from the pressure source 40 is supplied into the rod side pressure chamber of the actuator 5 by way of the route shown by a thick line in FIG. 5. As a result, the directional change-over valve 3 is shifted to the right in the drawing so that all the pressurized fluid from the hydraulic pump may be supplied into the head side pressure chamber of the bail actuating cylinder 12. Thus, the bail B will lower quickly to a connecting (falling-down) position.

Figure 6:
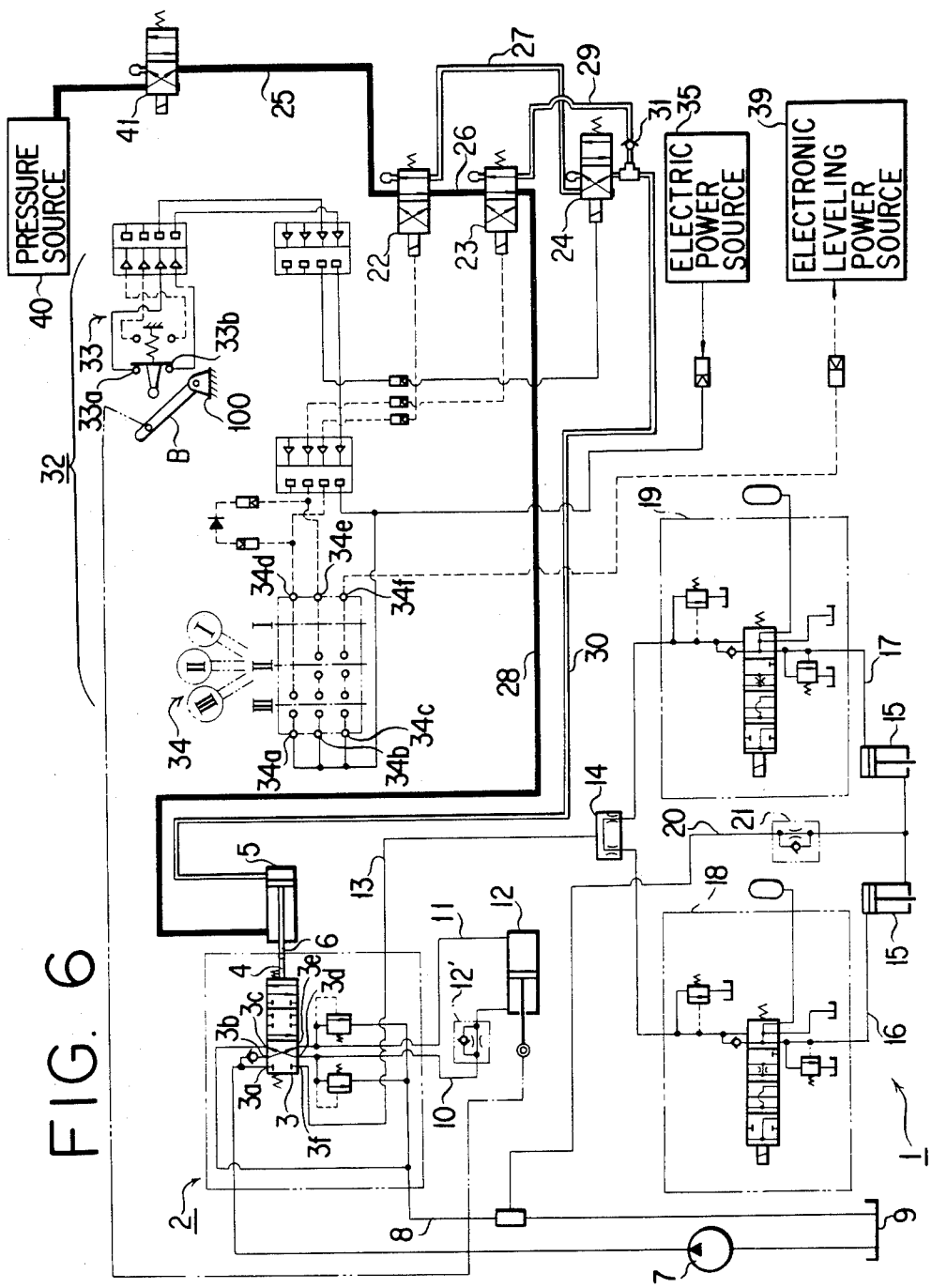

Further, as the bail B lowers, the limit switch 33 is turned on; but it can be seen from FIG. 6 that, nevertheless, the bail B continues its lowering motion. Stating in brief, in FIG. 6, when the bail B has left its top dead centre and begins to lower, the limit switch 33 is turned on. Consequently, the solenoid operated valve 24 is turned on. In this case, however, since the solenoid operated valve 24 is not directly concerned with the route of supply of the pressurized fluid from the pressure source 40, the pressurized fluid from the hydraulic pump 7 is continuously supplied into the head side pressure chamber of the bail actuating cylinder 12 until the bail B fails completely down in the same condition as that shown in FIG. 5.

According to one embodiment of the present invention, an air tank or reservoir leading to a compressor etc. may be used as the aforementioned pressure source 40. Therefore, in this case, the pressurized fluid is compressed air.

It it to be understood that the foregoing description is merely illustrative of a preferred embodiment of the invention, and that the invention is not to be limited thereto, but is to be determined by the scope of the appended claims.

What we claim is:

1. A control system for push-pull unit mounted on a motor scraper, characterized in that the control system comprises a push-pull control circuit including a bail actuating cylinder; a suspension control circuit including suspension cylinders; a directional change-over valve means adapted to change over the supply of the fluid under pressure delivered by a hydraulic pump into either one of said push-pull control circuit or said suspension control circuit in accordance with the indication of the operator; and an electric operating circuit for changing over said directional change-over valve, said electric operating circuit being connected with an electric power source.

2. The control system as claimed in claim 1, characterized in that said directional change-over valve means comprises an actuator for change-over operation; a pressurized medium passage connecting said actuator and a pressure source; and solenoid operated valve means provided in said pressurized medium passage to change over the direction of supply of the pressurized medium into said actuator, said solenoid operated valve means being connected with said electric operating circuit.

3. The control system as claimed in claim 1, characterized in that said directional change-over valve means includes a bail control valve.

4. The control system as claimed in claim 1, characterized in that said electric operating circuit includes an operating lever switch, and a limit switch adapted to be turned on or off in accordance with rising-up and falling-down of the bail.

5. The control system as claimed in claim 2, characterized in that the pressurized medium supplied into said actuator for change-over operation is compressed air.

6. The control system as claimed in claim 1, characterized in that said suspension control circuit includes automatic leveling control valve means leading to an electronic leveling power source and adapted to control the supply of pressurized fluid into the suspension cylinders.

7. The control system as claimed in claim 6, characterized in that said electronic leveling power source is connected with said operating lever switch.

* * * * *